United States Patent [19]

Sugimoto

[11] Patent Number: 5,762,373
[45] Date of Patent: Jun. 9, 1998

[54] BELT CONNECTING METAL FITTING AND MANUFACTURING METHOD FOR THE SAME

[75] Inventor: Mutsumi Sugimoto, Hamamatsu, Japan

[73] Assignee: Yugengaisha Mutsumichi Kenkyujo, Japan

[21] Appl. No.: 585,167

[22] Filed: Jan. 11, 1996

[30] Foreign Application Priority Data

Jan. 11, 1995 [JP] Japan .................................. 7-002667
Dec. 15, 1995 [JP] Japan .................................. 7-327036

[51] Int. Cl.6 .................................................. B60R 21/10
[52] U.S. Cl. ........................ 280/808; 280/801.1; 297/483
[58] Field of Search ............................ 280/801.1, 808; 297/483, 468, 486

[56] References Cited

U.S. PATENT DOCUMENTS

| | | | |
|---|---|---|---|
| 4,652,012 | 3/1987 | Biller et al. | 297/483 X |
| 4,884,825 | 12/1989 | Grunewald et al. | 297/483 X |
| 4,915,414 | 4/1990 | Weman | 280/801.1 |
| 5,513,880 | 5/1996 | Ohira et al. | 280/808 |
| 5,516,148 | 5/1996 | Ohira | 297/483 X |

FOREIGN PATENT DOCUMENTS

| | | | |
|---|---|---|---|
| 2-120272 | 9/1990 | Japan . | |
| 2255897 | 11/1992 | United Kingdom | 280/808 |

Primary Examiner—Christopher P. Ellis
Attorney, Agent, or Firm—Ronald P. Kananen

[57] ABSTRACT

A belt connecting metal fitting for a seat belt device of a vehicle comprises a metal fitting plate body, and a belt insertion means formed as a slot formed to the metal fitting plate body through which a seat belt is inserted. The belt inserting slot is provided with bulged portions on both surfaces of the plate body so as to provide a thickened portion at least to an edge portion with which the belt is engaged to form a central belt insertion hole, the edge portion of the belt inserting slot having substantially circular curved cross section. A belt mounting hole is formed to the metal fitting plate body to secure the belt. At least the belt engaging portion of the metal fitting plate body is coated with a resin material formed through a resin molding process with the belt insertion hole remaining uncoated.

18 Claims, 12 Drawing Sheets

BELT CONNECTING METAL FITTING AND MANUFACTURING METHOD FOR THE SAME

BACKGROUND OF THE INVENTION

The present invention relates to a belt connecting metal fitting for a safety belt, a seat belt and the like for an automotive body and a manufacturing method for the same and, more particularly, to a belt connecting metal fitting designed to effectively prevent breakage or tearing of a belt such as a safety belt and a manufacturing method for the same.

In general, an automotive body, seat, or the like is equipped with a seat belt device as a safety belt device. The seat belt device employs a seat belt, which is comprised of a fiber material such as a synthetic fiber woven into a band shape, as webbing. A belt connecting metal fitting is used to connect such a seat belt to the automotive body or seat.

The belt connecting metal fitting is made by punching a steel plate into a predetermined shape and forming a belt inserting slot in a portion of the steel plate which has been punched in the predetermined shape. A seat belt is passed through the belt inserting slot, then the belt connecting metal fitting is fixed to an automotive body or seat. This type of belt connecting metal fitting is available in an anchor metal fitting, steel anchor metal fitting, tongue plate, etc.

A conventional belt connecting metal fitting is made by punching the belt inserting slot in a steel metal fitting plate and press-molding it. Punching the metal fitting plate, however, produces burrs on the edge of the belt inserting slot and the burrs may form sharp edges. Therefore, the edge of the belt inserting slot is deburred to smooth the cross section of the edge of the belt inserting slot.

To smooth the cross section of the belt inserting slot of the metal fitting plate, a corner of the belt inserting slot is ground by using a polishing device to form a radius, or the inner edge of the belt inserting slot is subjected to a resin coating process. The conventional belt connecting metal fitting, however, has restrictions on machining cost and materials used in increasing the thickness of the metal fitting plate. For this reason, there was a danger in that the seat belt inserted through the belt inserting slot is pulled through local point contact or line contact in the belt inserting slot and the seat belt breaks or tears at the contacting portion.

In order to prevent the breakage or tearing of the seat belt, a belt connecting metal fitting has been developed as disclosed in Utility Model Laid-Open No. 2-120272.

In the seat connecting metal fitting disclosed in the above prior art publication, the edge of the belt inserting slot formed in the metal fitting plate is molded by using a top die and a bottom die and the edge of the belt inserting slot is bulged to one surface of the plate so that the cross section of the edge of the belt inserting slot has a semicircular shape, so that the seat belt inserted through the belt inserting slot contacts at its surface with the semicircular edge of the belt inserting slot, thereby preventing the seat belt from breaking or tearing.

In the conventional belt connecting metal fitting, the edge of the belt inserting slot of the metal fitting plate is bulged on one surface of the plate by molding it using a top die and a bottom die so that the edge of the belt inserting slot has a semicircular cross section. According to this construction, the mating surface of the top and bottom dies is positioned in the central area of the wall thickness of the belt inserting slot. This presents a problem in that post-machining is required for removing the burrs produced on the mating surface of the top and bottom dies. There is another problem in that the edge of the belt inserting slot merely bulges out on one side of the plate, so that the pulling force of the seat belt is applied to the metal fitting plate in poor balance. There is still another problem in that an adequate size of curvature radius of the semicircular cross section cannot be secured, and therefore, the seat belt has a smaller surface-contact area when the seat belt is inserted through the belt inserting slot with the smaller curvature radius, making it difficult to achieve effective prevention of the tearing or breakage of the seat belt.

SUMMARY OF THE INVENTION

A primary object of the present invention is to substantially eliminate defects or drawbacks encountered in the prior art described above and to provide a belt connecting metal fitting which effectively and securely prevents a belt from breaking or tearing by providing the edge portion of the belt inserting slot in a metal fitting plate with a large curvature radius so as to increase the surface-contacting area of the belt and also to provide a manufacturing method for the same.

Another object of the present invention is to provide a belt connecting metal fitting which is designed so that the pulling force of a seat belt is applied to the metal fitting plate in good balance and that the belt engaging edge portion of the belt inserting slot requires no post-machining such as deburring and also to provide a manufacturing method for the same.

A further object of the present invention is to provide an inexpensive belt connecting metal fitting which is capable of eliminating the need for providing the area around the belt inserting slot of the metal fitting plate with resin coating and also to provide a manufacturing method for the same.

These and other objects will be achieved according to the present invention by providing, in one aspect, a belt connecting metal fitting for a seat belt device of a vehicle: comprising:

a metal fitting plate body;

a belt insertion means formed as a slot formed to the metal fitting plate body through which a seat belt is inserted; and a belt mounting means formed as a hole formed to the metal fitting plate body;

wherein the belt inserting slot is provided with bulged portions on both surfaces of the plate body so as to provide a thickened portion at least to an edge portion of the belt inserting slot with which the belt is engaged to form a central belt insertion hole, the edge portion of the belt inserting slot on a side formed with the bulged portion having substantially circular curved cross section.

In preferred embodiments, the metal fitting plate body is formed of a strip steel plate. The metal fitting plate body is bent along a line crossing over the belt insertion slot so as to provide a predetermined inclination.

The belt connecting metal is formed as an anchor metal fitting plate for a seat belt device of a vehicle.

In another aspect, there is provided a belt connecting metal fitting for a seat belt device of a vehicle: comprising:

a metal fitting plate body; and a belt insertion means formed as a slot formed to the metal fitting plate body through which a seat belt is inserted;

wherein the belt inserting slot is provided with bulged portions on both surfaces of the plate body so as to provide a thickened portion at least to an edge portion of the belt inserting slot with which the belt is engaged to form a central belt insertion hole, the edge portion of the belt inserting slot having a smooth curved cross section and at least the belt engaging portion of the metal fitting plate body is coated with a resin material formed through a resin molding process with a belt insertion hole remaining uncoated.

In the preferred embodiments, the metal fitting plate body is formed of a strip steel plate. The metal fitting may be formed as a tongue plate provided with a tongue engaging hole.

The metal fitting plate body is provided with a slip prevention hole for preventing the belt from slipping formed on the belt engaging side of the plate body substantially in parallel to the belt inserting slot. The slip prevention hole may be formed integrally through the resin molding process.

The belt connecting metal fitting may be formed as a through anchor metal fitting for a seat belt device of a vehicle.

In a further different aspect of the present invention, there is provided a method of manufacturing a belt connecting metal fitting for a seat belt device of a vehicle comprising the steps of:

preparing a metal plate member from which a metal fitting plate of a belt connecting metal fitting is formed;

forming a belt insertion slot to the metal fitting plate through a punching process by means of a pressing punch and die with an extra clearance;

pressing and deforming one surface side of the metal fitting plate while spreading a surface on the extra clearance side of the punched belt inserting slot;

pressing the one surface from one surface side of the metal fitting plate to push back while rolling in the deformed portion of the belt inserting slot to protrude the deformed portion to another surface side of the metal fitting plate so as to form bulged portions which protrude on both surfaces of the metal fitting plate on the edge portion of the belt inserting slot at a concave curved surface so that the edge portion is formed as a belt engaging edge portion of the belt inserting slot.

In preferred embodiments, when the belt inserting slot of the metal fitting plate is formed, at least the belt engaging edge portion of the belt inserting slot is displaced so as to be rolled from a central portion thereof to both surfaces of the metal fitting plate so that the edge portion with the bulged portion of the belt inserting slot has an approximately circular curved cross section.

The method may further comprise a step of forming a belt mounting hole to the metal fitting plate, comprise a step of bending the metal fitting plate along a line crossing over the belt inserting slot with a predetermined angle with respect to the horizontal portion of the metal fitting plate, and comprise a step of performing a mold formation and coating with a resin material to the belt inserting slot on the belt engaging side portion with a seat belt insertion hole remaining uncoated.

In the belt connecting metal fitting according to one aspect of the present invention of the characters described above, the belt inserting slot in the metal fitting plate is provided with portions bulging on both surfaces of the plate by adding extra thickness at least to the edge portion to which the belt is attached and the edge of the belt inserting slot where the bulged portion has been formed has a nearly circular curved cross section. Therefore, the pulling force of the seat belt is applied to the metal fitting plate in good balance, a larger curvature radius can be obtained for the belt engaging edge of the belt inserting slot, and smooth surface contact with the seat belt can be realized through the larger contact surface, thereby effectively and surely preventing the belt from breaking or tearing.

In the belt inserting slot in the metal fitting plate, the bulged portions on both surfaces of the plate of at least the belt engaging edge portion are formed in good balance and the belt engaging edge portion of the belt inserting slot is given a nearly circular curved cross section. This eliminates the need for padding the edge corners of the belt inserting slot by resin-coating, making it possible to manufacture the belt connecting metal fitting at low manufacturing cost.

According to another aspect of the present invention of the characters described above, the belt inserting slot is provided with bulged portions on both surfaces of the metal fitting plate body so as to provide a thickened portion at least to an edge portion of the belt inserting slot with which the belt is engaged, the edge portion of the belt inserting slot has a smooth curved cross section and at least the belt engaging portion of the metal fitting plate body is coated with a resin material formed through a resin molding process with a belt insertion hole remaining uncoated. Accordingly, the curvature radius of the belt engaging side edge portion of the belt inserting slot is made large and that portion is protruded in a balanced condition on each surface side of the metal fitting plate, so that the belt-contacting area can be increased to thereby suitably and smoothly insert the belt through the belt inserting slot with a balanced tension force of the seat belt, thereby effectively and securely preventing the belt from breaking or tearing.

According to the further aspect of the present invention concerning the manufacturing method for the belt connecting metal fitting described above, a belt inserting slot is punched in the metal fitting plate by providing at least a part of a machining punch and a die with an extra clearance, then the sheared surface of the punched belt inserting slot on the extra clearance side is spread by using a spreading punch while pressing it against one surface of the metal fitting plate and it is pressed from one surface of the plate by using a forming punch and pushed back while the deformed edge portion of the belt inserting slot being rolled in so that it bulges out to the other surface of the metal fitting plate, thereby forming a bulged portion which protrudes on both surfaces of the metal fitting plate on the edge portion of the belt inserting slot at a surface where a concave curvature has been formed and where the forming punch and the forming die face each other. The edge portion with the bulge thus formed is provided as a belt engaging edge portion of the belt inserting slot. Hence, the belt engaging edge portions are bulged on both sides, permitting a larger curvature radius of each of the belt engaging edge portion and allowing smooth surface contact with the seat belt through the larger contact area. This effectively and securely prevents the seat belt from breaking or tearing.

According to the manufacturing method, at least the belt engaging portion of the metal fitting plate body may be coated with a resin material formed through a resin molding process with a belt insertion hole remaining uncoated. Through this process, the bulged portions are further thickened to provide a smooth circular curved surface, so that a large contacting area can be realized, thus also effectively and securely preventing the seat belt from breaking or tearing.

Furthermore, the belt inserting slot of the metal fitting plate is formed by using the forming punch and the forming die so that the material of at least the belt engaging edge portion is rolled it from the central part to both surfaces of the metal fitting plate. Hence, no burr is produced on at least belt engaging edge portions of the belt inserting slot, and therefore, no post-machining such as deburring is necessary, leading to improved economy.

The nature and further characteristic features of the present invention will be made more clear from the following disclosure made with reference to the accompanying drawings.

DESCRIPTION OF THE PREFERRED EMBODIMENTS

Preferred embodiments of the present invention will be described hereunder with reference to the accompanying drawings.

Figure 1:
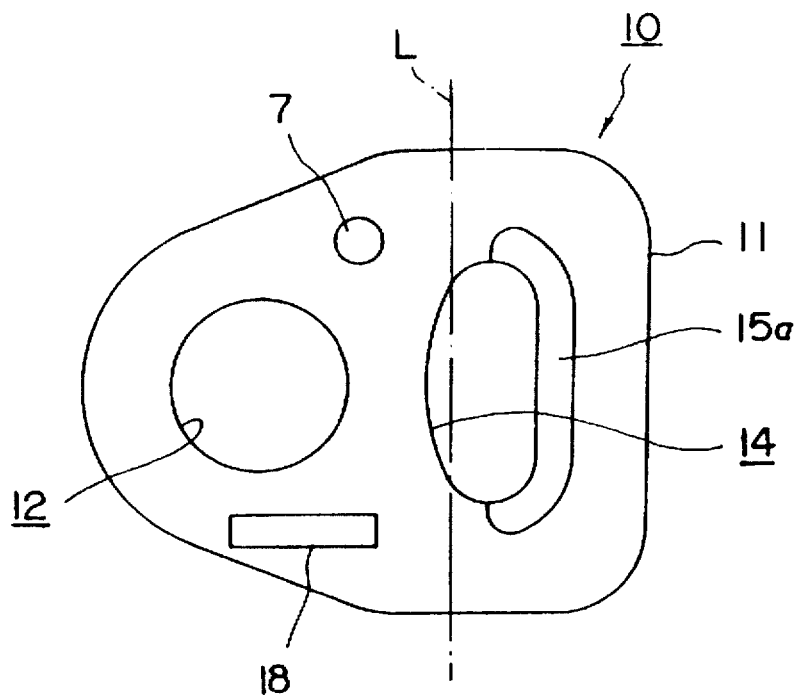
FIG. 1 is a top plan view illustrative of a first embodiment of a belt connecting metal fitting, as an anchor metal fitting according to the present invention.
Figure 2A:
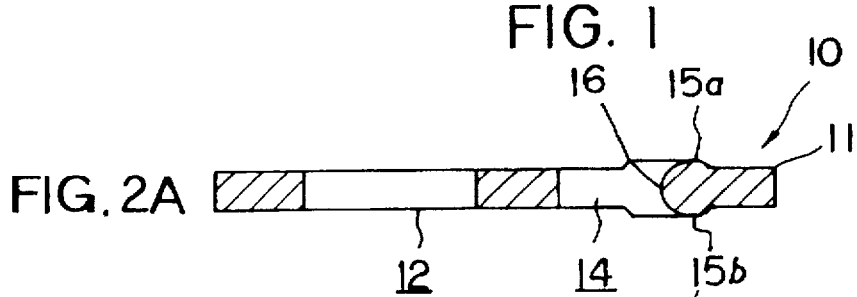
FIG. 2A is a cross-sectional view illustrative of the belt connecting metal fitting of FIG. 1 before it is bent and FIG. 2B is a cross-sectional view illustrative of the belt connecting metal fitting after it is bent.
Figure 2B:
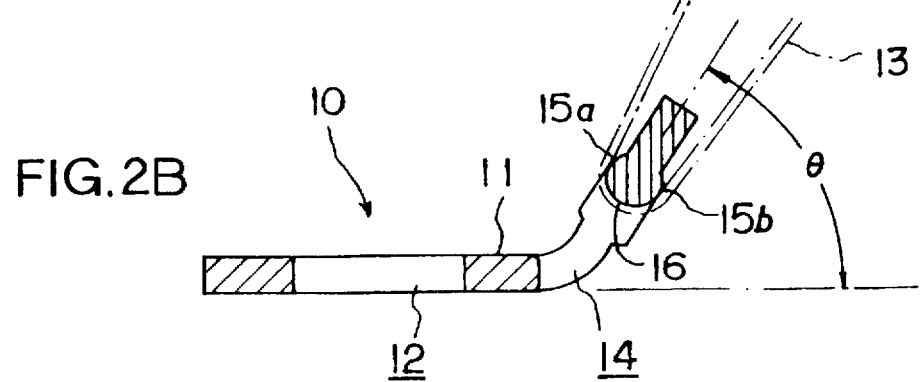
Figure 10:
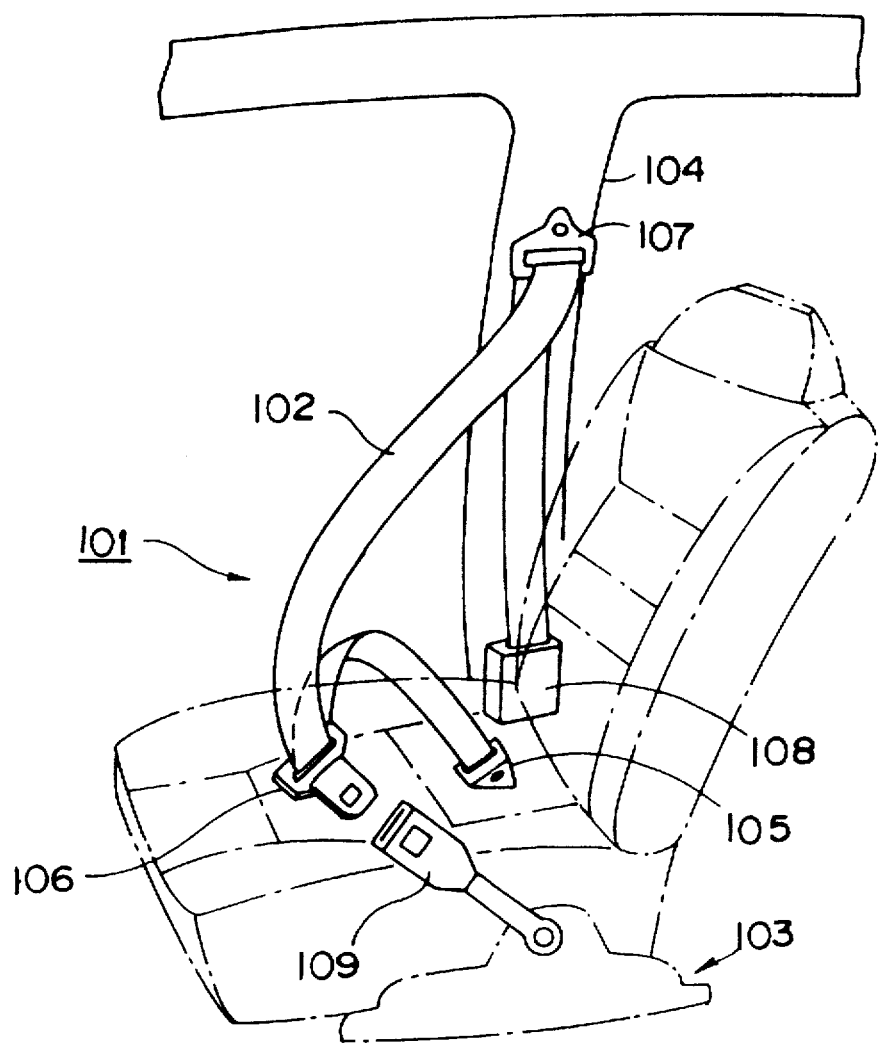
FIG. 10 is a perspective view showing a state that the belt connecting metal fitting according to the embodiments of the present invention which is applied to a seat belt device of an automotive body.

FIG. 1 and FIG. 2 show a first embodiment of the belt connecting metal fitting in accordance with the present invention which is employed as an anchor metal fitting of a seat belt device fixed to an automotive body. The general aspect of the seat belt device to which the present invention is applicable is shown in FIG. 10, which will be described in detail hereinafter.

A belt connecting metal fitting 10 has a metal fitting plate 11 made of a steel plate of high tensile steel or the like. The metal fitting plate 11 is formed by punching a strip steel plate, and a plate mounting hole 12, through which an anchor bolt, not shown, is inserted, and a belt inserting slot 14, through which a seat belt 13 can be inserted, are formed. After the plate mounting hole 12 and the belt inserting slot 14 are formed, the metal fitting plate 11 is bent along bending line L at a predetermined angle θ, e.g. 60 degrees or less, preferably about 35 degrees. Bending line L involves the belt inserting slot 14 and partly crosses over the belt inserting slot 14.

The belt inserting slot 14 formed in the metal fitting plate 11 is shaped into a lengthwise slot which extends in the direction of the width of the metal fitting, and bulged portions 15a, 15b, which bulge out on both surfaces of the plate in good balance, are formed on at least belt engaging edge portion of the belt inserting slot 14, so that the belt engaging edge portion has an approximately circular, smoothly curved cross section.

Figure 3:
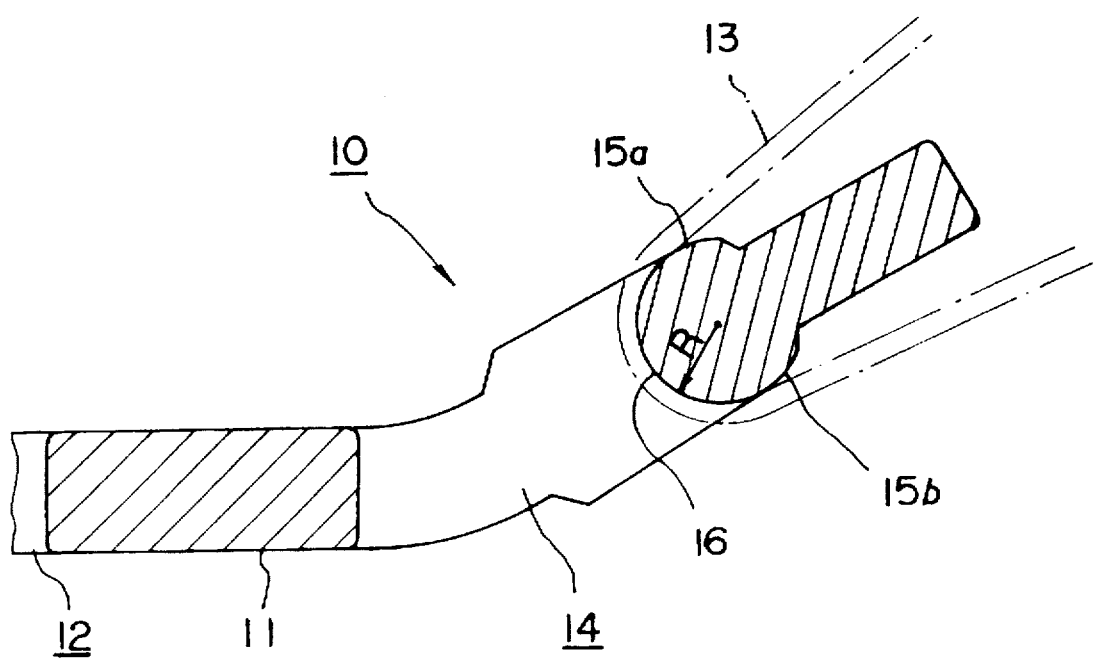
FIG. 3 is a sectional view of the belt connecting metal fitting of the above embodiment.

As shown in FIG. 3, in the belt inserting slot 14 of the metal fitting plate 11, the thickness of the belt engaging edge is increased on both surfaces of the plate so as to form the bulged portions 15a, 15b, which protrude out on both surfaces of the plate in good balance, on the belt engaging edge. The belt engaging side of the belt inserting slot 14 is configured to have a smoothly curved section 16, which has a nearly circular cross section, by making use of the bulged portions 15a, 15b. This allows a large curvature radius R of the nearly circular curved surface of the belt engaging edge of the belt inserting slot 14. Hence, a curvature radius, which is equivalent to the one obtained from a thicker plate, can be achieved without entirely increasing the wall thickness (plate thickness) of the metal fitting plate 11, ensuring smooth contact with the seat belt 13 inserted through the belt inserting slot 14 through a larger contact area. This effectively and securely prevents the breakage or damage of the seat belt 14 with resultant improved durability of the seat belt 13.

The belt inserting slot 14 of the metal fitting plate 11 is provided with the bulged portions 15a, 15b, which protrude on both surfaces of the plate, at least on the belt engaging edge portion, and a curved portion 16 having an almost circular cross section is formed on the belt engaging side by making use of the bulged portions 15a, 15b. The curved portion 16 is formed so that it extends over to both surfaces of the plate to have a large curvature radius, making it equivalent to a rib which smoothly continues to the inner edge of the belt inserting slot on both surfaces of the plate of the belt inserting slot 14. Thus, the wear or breakage of the seat belt 13 can be effectively prevented, leading to improved durability of the seat belt 13. Reference numeral 17 denotes a marking space and a reference numeral 18 denotes a lot number marking space.

Figure 4:
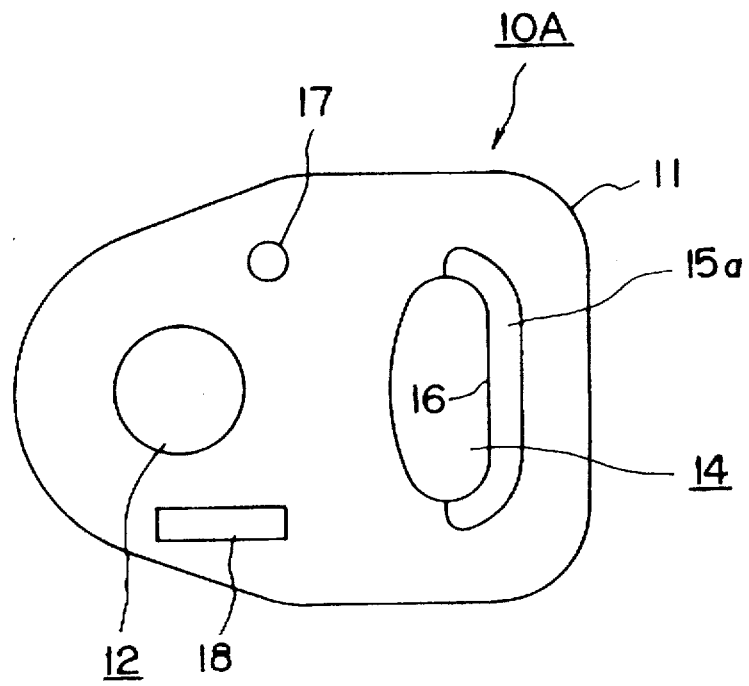
FIG. 4 shows a plan view of a second embodiment of the belt connecting metal fitting in accordance with the present invention.
Figure 5:
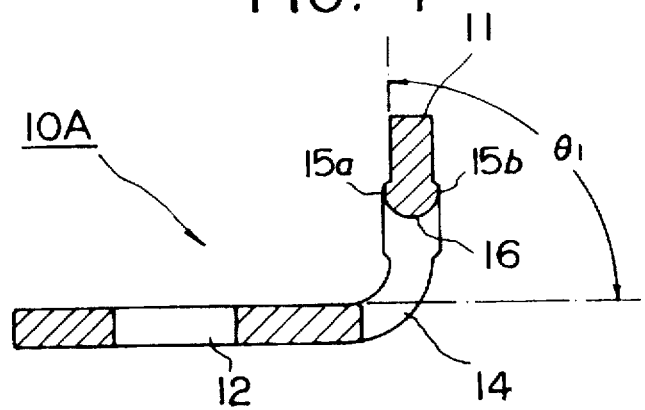
FIG. 5 is a sectional view illustrative of the belt connecting metal fitting shown in FIG. 4 after it is bent.

As shown in FIG. 4 and FIG. 5, bending angle θ1 of the metal fitting plate 11 of a belt connecting metal fitting 10A used as the anchor metal fitting may be 60 to 90 degrees, for example, and preferably about 90 degrees. At this time, the belt inserting slot 14 formed in the metal fitting plate 11 may be formed so that the longitudinal central portion of the belt engaging edge protrudes out toward the opposite edge of the inserting slot.

The manufacturing apparatus and the manufacturing method for the belt connecting metal fitting will now be described with reference to FIGS. 6 to 9.

Figure 6:
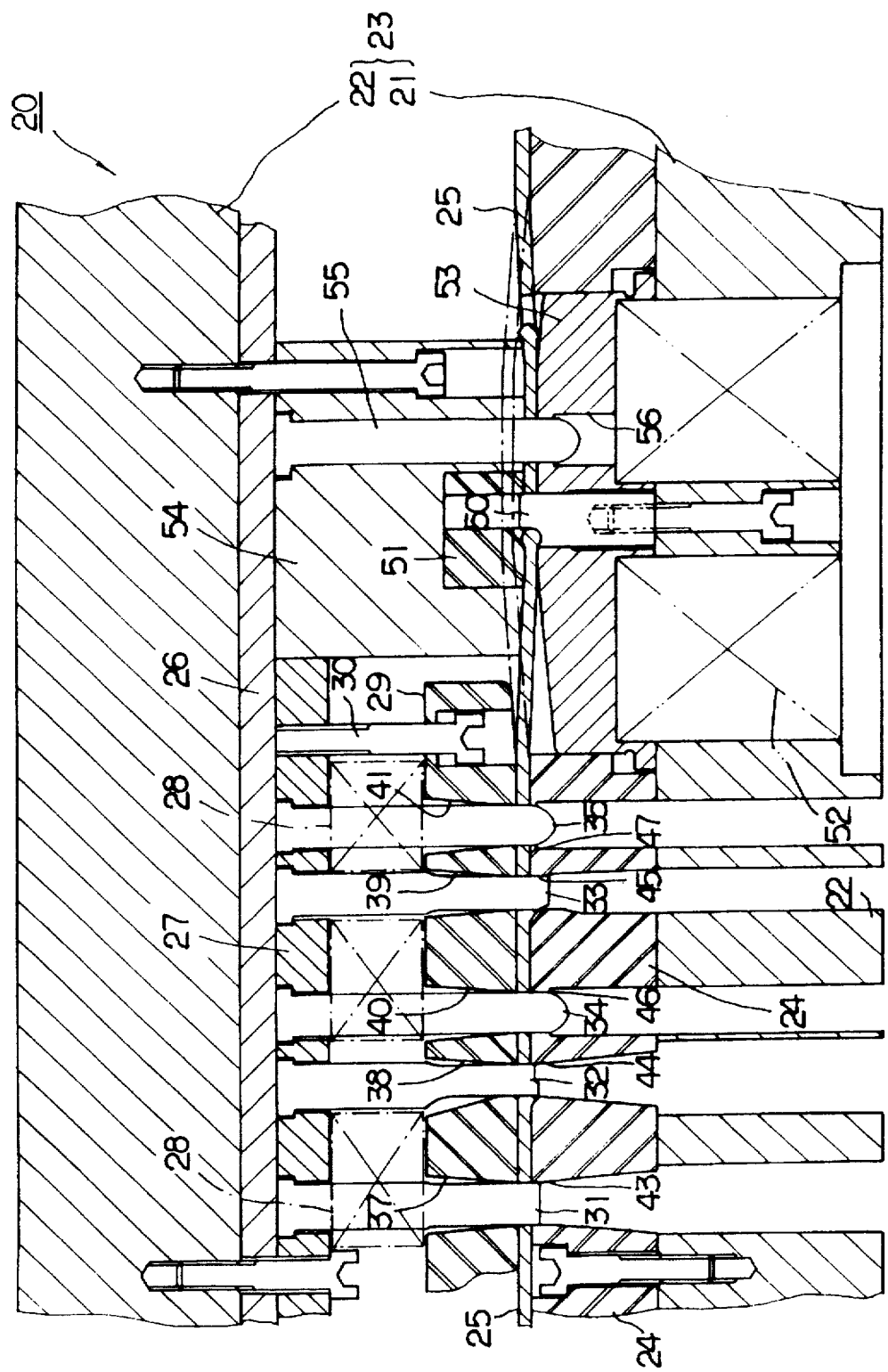
FIG. 6 is a schematic sectional view showing a pressing machine for manufacturing the belt connecting metal fittings of the present invention.

The manufacturing apparatus for the belt connecting metal fitting is constituted by a punching type continuous pressing machine 20 shown in FIG. 6. The pressing machine 20 has a die set 23 constructed by a fixed bottom die 21 and a movable top die 22, and a die plate 24 is fixed on the bottom die 21 of the die set 23 and a strip steel plate 25 to be formed is rested on the die plate 24. The strip steel plate 25 is comprised of high tensile steel or the like, and it is shaped like a belt so that the metal fitting plate 11 continues in alignment at predetermined pitches via a weakening area.

A punch fixing plate 27 is fixed on the top die 22 of the die set 23 via a gasket plate 26 made of quenched steel, and the punch fixing plate 27 elastically supports a stripper plate 29 by a plate holder 30 via a plurality of springs 28 composed of multilayer disc springs or the like. The stripper plate 29 is always urged downward by the plurality of springs 28 installed on both sides.

A blanking punch 31, a machining punch 32, a spreading punch 33, and pilots 34, 35 are arranged and fixed in alignment at predetermined intervals on the punch fixing plate 27 which is fixed to the top die 22 of the die set 23. Punch guide apertures 37, 38, 39 and pilot guide apertures 40, 41 for guiding the blanking punch 31, the machining punch 32, the pilot 34, the spreading punch 33, and the pilot 35, which are fixed to the punch fixing plate 27, are formed in the stripper plate 29. Die apertures 43, 44, 45 and pilot guide apertures 46, 47 are formed in the die plate 24 so that they face against the punch guide apertures 37, 38, 39 and the pilot guide apertures 40, 41 in the stripper plate 29.

Thus the die plate 24 with the die apertures 43, 44, 45, and the blanking punch 31, the machining punch 32, and spreading punch 33 which are fixed to the punch fixing plate 27 constitute the punch and die so as to enable required blanking, shearing, or forming.

In the pressing machine 20, a forming punch 50 and a forming die 51 made of cemented carbide are provided on the downstream side of the spreading punch 33 and the die 45. The forming punch 50 is fixed to the bottom die 21 of the die set 23, and the forming punch 50 serves to guide the vertical movement of a movable platform 53 which is elastically supported by a spring 52 composed of the multilayer disc spring or the like. The forming die 51 is incorporated in an anchor block 54 which is fixed to the top die 22 of the die set 23. Fixed to the anchor block 54 is a pilot 55 which positions the metal fitting plate 11, and the pilot 55 is guided by a pilot guide aperture 56 which is formed in the movable platform 53.

The pressing machine 20 is further equipped with a forming punch and a die (both are not shown) for cutting the strip steel plate 25 into individual metal fitting plates 11 while bending them at a predetermined angle, the forming punch and the die being located on the downstream side of the forming punch 50 and the die 51.

In the pressing machine 20, the blanking punch 31 and the die of the die plate 24 are used to punch the plate mounting hole 12 in the metal fitting plate 11 of the strip steel plate 25 by the top die 22 which moves up and down.

The strip steel plate 25, in which the plate mounting hole 12 has been punched in the metal fitting plate 11, is fed forward by one pitch P. When the strip steel plate 25 has been fed by the predetermined pitch, the top die 22 moves downward by a predetermined stroke, and the pilot 34 is inserted through the punched plate mounting hole 12 to position the metal fitting plate 11 and the metal fitting plate 11 is punched by the machining punch 32 and a die 60 of the die plate 24 to provide the belt inserting slot 14. At this time, the plate mounting hole 12 is formed in the following metal fitting plate 11 by the blanking punch 31 and the die of the die plate 24.

Figure 7:
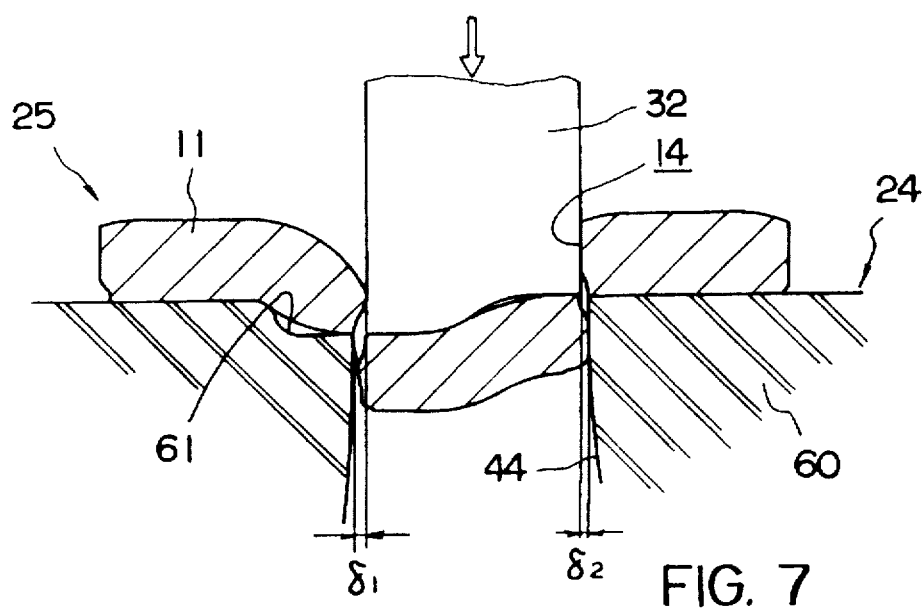
FIG. 7 is a sectional view illustrative of the manufacturing process of the belt connecting metal fittings in a state of a punching process by a machining punch and a die.

The machining punch 32 and the die 60 on the die plate 24 of the pressing machine 20 are constructed as shown in FIG. 7. Clearance δ between the machining punch 32 and the die 60 is not even all around the belt inserting slot 14, and instead, extra clearance δ1 is given on a part of the belt inserting slot 14, e.g., the belt engaging side. The extra clearance δ1 is a gap which is 10% to 20% larger than the thickness (e.g. 3.2 mm) of the strip steel plate which is the material, preferably about 15% to 20% larger; the rest of the belt inserting slot 14 is provided with an appropriate clearance δ2 which is, for example, 5% to 10% larger than the plate thickness, preferably about 5% to 6% larger than the plate thickness.

At the time of punching the belt inserting slot 14 in the metal fitting plate 11 of the strip steel plate 25 by the machining punch 32 and the die 60, a clearance groove 61 formed in die 60 on the belt engaging side serves to press the belt engaging edge of the belt inserting slot 14 against one surface (bottom surface) of the plate to slightly deform it so as to spread the plate material of the belt engaging edge, particularly the plate material of the other surface (top surface) of the plate.

In the following step, as illustrated in FIG. 6, after the belt inserting slot 14 is punched in the metal fitting plate 11 of the strip steel plate 25, the top die 22 is moved upward by a predetermined stroke to draw out the machining punch 32 and the pilot 34 from the belt inserting slot 14 and the plate mounting hole 12 in the metal fitting plate 11 of the strip steel plate 25. After drawing them out, the strip steel plate 25 is fed forward by one pitch and the top die 22 is moved down again by the predetermined stroke to position the pilot 35 by fitting it in the plate mounting hole 12 of the metal fitting plate 11, then the spreading punch 33 and the die 62 of the die plate 24 spread (compress) at least the belt engaging edge of the belt inserting slot 14 while pressing it to deform it toward one surface (bottom surface) of the plate.

Figure 8:
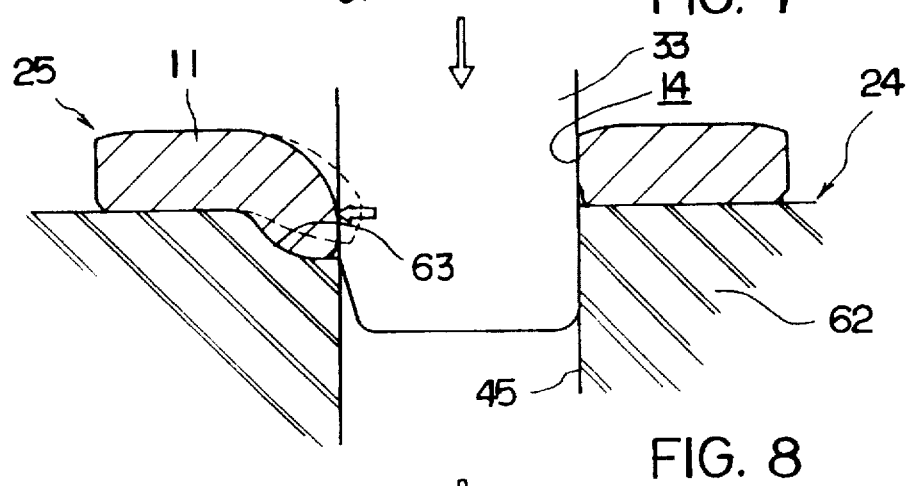
FIG. 8 is a sectional view illustrative of the forming process by a spreading punch and a die.
Figure 9:
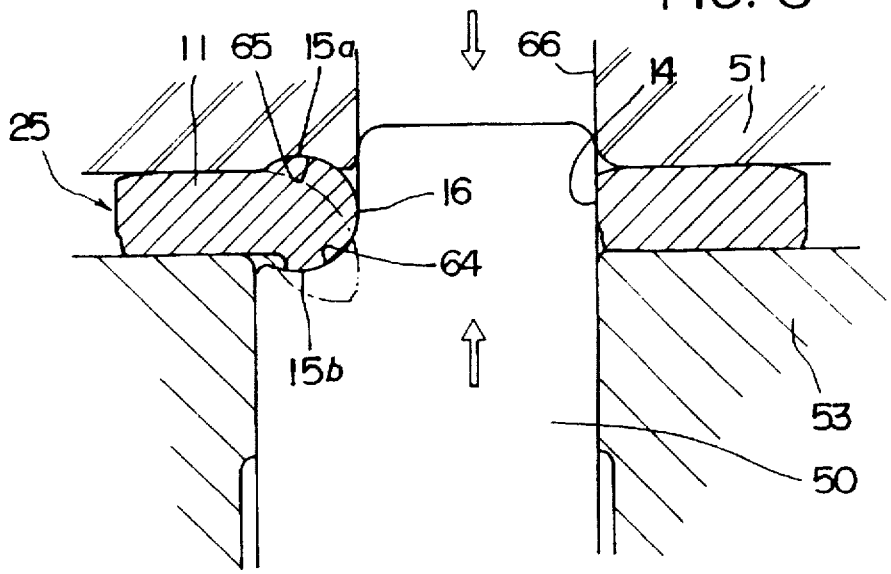
FIG. 9 is a sectional view illustrative of the forming process by a forming punch and a die.

The spreading punch 33 and the die 62 are configured as shown in FIG. 8. A part of the circumference of the spreading punch 33 is tapered in the axial direction so that at least the belt engaging edge of the belt inserting slot 14 is pressed open wider (compressed and bent) as the spreading punch 33 moves down. More specifically, as the spreading punch 33 moves down, the belt engaging edge of the belt inserting slot 14 is spread and pressed and deformed toward one surface (bottom surface) of the plate at the same time so that the sheared cross section of the belt engaging edge of the belt inserting slot 14 is smoothly pressed and formed by the tapered surface of the spreading punch 33 until it fits in a clearance groove 63 of the die 62.

After the spreading punch 33 and the die 62 press and spread the belt inserting slot 14 of the metal fitting plate 11 of the strip steel plate, the top die 22 is moved up as shown in FIG. 6 to pull out the spreading punch 33 and the pilot 35 from the belt inserting slot 14 and the plate mounting hole 12. At this time, the belt inserting slot 14 is formed in the following metal fitting plate 11 of the strip steel plate 25 by the machining punch 32 and the die plate 24 and the plate mounting hole 12 is punched in the further subsequent metal fitting plate 11 by the blanking punch 31 and the die of the die plate 24. Thus, the strip steel plate 25 is continuously subjected to the forming process in sequence.

After the belt inserting slot 14 is punched, spread, and bent in the metal fitting plate 11 by the spreading punch 33, the strip steel plate 25 is fed forward again. When the strip steel plate 25 is fed forward by, for example, two pitches, the metal fitting plate 11 of the strip steel plate 25 is guided to the forming punch 50 and the die 51 shown in FIG. 10. Moving the top die 22 in the position shown in FIG. 9 by the predetermined stroke causes the belt engaging edge of the belt inserting slot 14 in the metal fitting plate 11 to bulge on both surfaces of the plate, thereby forming arc bulged portions 15a, 15b on both surfaces of the plate.

At this time, the belt connecting metal fitting punch 50 and the die 51 have concave curve forming surfaces 64, 65 facing against each other in an arc shape on the belt engaging side of the belt inserting slot 14 and the downward movement of the top die 22 guides a die aperture 66 of the die 51 to the forming punch 50. The forming punch 50 and the die 51 together form a smooth arc curved portion 16 which bulges in good balance on both sides of the belt engaging edge of the belt inserting slot 14.

At that time, the forming punch 50 presses the belt engaging edge of the belt inserting slot 14 from one surface (bottom surface) of the plate and it rolls the belt engaging edge of the belt inserting slot 14 along the concave curve forming surface 64 of the forming punch 50 and presses it back to make it bulge to the other surface (top surface) side of the plate. The bulge to the other surface side of the plate is formed by guiding the edge to the arc concave curve forming surface 65 of the die.

When forming the belt inserting slot 14 in the metal fitting plate 11 by the forming punch 50 and the forming die 51 in such a manner, at least the material of the belt engaging edge of the belt inserting slot 14 is displaced so that it is rolled from the central part to both surfaces of the plate, causing the edge with the bulge of the belt inserting slot 14 to have a nearly circular smoothly curved cross section. This makes it possible to secure a large curvature radius of the belt engaging edge of the belt inserting slot 14 without increasing the thickness of the metal fitting plate 11 and it produces no burr on the bulged curved portion 16 of the belt engaging edge of the belt inserting slot 14, eliminating the deburring or other post-machining process.

After the bulged portions 15a, 15b are formed on both surfaces of the plate in the belt inserting slot 14 of the metal fitting plate 11 by the forming punch 50 and the die 51, the strip steel plate 25 is moved forward again and guided to the forming punch and the die, which are not shown, and the strip steel plate 25 is cut to produce the individual metal fitting plate 11. The metal fitting plate, which has been cut off, is bent to the predetermined angle to make the desired belt connecting metal fitting 10.

The belt engaging edge of the belt inserting slot 14 in the belt connecting metal fitting 10 thus produced bulges on both surfaces of the plate and has a nearly circular curved cross section with a large curvature radius. Hence, there is no need to apply resin coating of vinyl chloride resin or the like to the edge of the belt inserting slot 14 of the belt connecting metal fitting 10, thus enabling effective prevention of the breakage of tearing of the seat belt 13 without providing such resin coating.

In the embodiments of the present invention described above, the pressing machine is employed to continuously blank and form the belt connecting metal fitting out of a strip steel plate. However, the individual metal fitting plates may be formed separately by a pressing apparatus. The pressing machine should be suited for mass production so that it is capable of continuously press-forming a plurality of rows of strip steel plates at the same time.

Further, in the embodiments of the present invention, the belt connecting metal fitting is employed as the anchor metal fitting. However, the belt connecting metal fitting is not limited to the anchor metal fitting, and it may also be applied to a through anchor metal fitting, a safety belt buckle metal fitting, or a buckling tongue plate. In the case of the buckle metal fitting or the tongue plate, a machining guide hole is formed in place of the plate mounting hole.

A further embodiment of the present invention will be described hereunder with reference to FIGS. 10 to 23.

FIG. 10 shows an embodiment of a belt connecting metal fitting applied to a seat belt device or assembly fixed to an automotive body. In a seat belt device 101 of this embodiment, one end portion of a seat belt 102 as webbing is engaged with an anchor fitting 105 as a mini-anchor mounted to a floor portion or a lower end portion of a center pillar 104 of the automotive body 103. The other end of the seat belt 102 is connected to a spreading device 108 as a seat belt retructor through a tongue plate 106 and a through anchor metal fitting 107 as a guide anchor, and the seat belt 102 is wound up in a seat belt accommodation side by an urging force of the spreading device 108. The through anchor metal fitting 107 is supported to be swingable by means of bolt to the center pillar 104 or a shoulder adjuster, not shown, as an elevation device attached to the center pillar 104.

The tongue plate 106 is detachably engaged with a buckle device 109 disposed on a side portion of the seat at substantially the central portion of the automotive body, and under the engaged condition, the seat belt 102 is made slidable in its longitudinal direction so as to be freely taken out or in.

Figure 11:
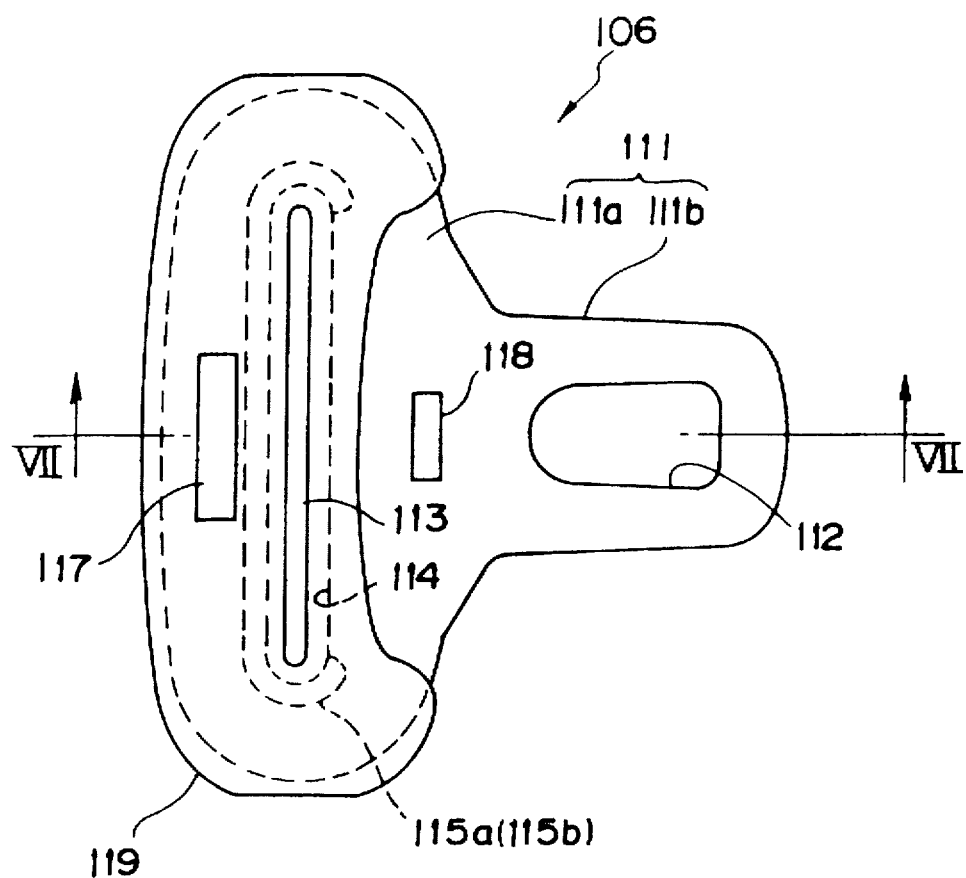
FIG. 11 shows a plan view of a third embodiment of a belt connecting metal fitting applied to a tongue plate according to the present invention.

FIG. 11 shows an example of the belt connecting metal fitting of the present invention which is utilized as a tongue plate 106 of the seat belt device 101.

Referring to FIG. 11, the tongue plate 106 is composed of a metal fitting plate 111 formed of steel such as carbon steel of S55CM. The metal fitting plate 111 is for example formed by punching a strip, i.e. belt-shape, steel plate having a thickness of 2.3 mm so as to provide substantially a T-shape hole. The metal fitting plate 111 is comprised of an operation side base portion 111a for carrying out a plate operation and a tongue portion 111b detachably mounted to the buckle device 109 and further provided with a tongue engaging hole 112 engaging the tongue portion 111b with the buckle device 109 and the a belt inserting hole 114 forming a central seat belt insertion hole 113 through which the seat belt 102 is inserted. Furthermore, a seat belt engaging side of the metal fitting plate 111 is molded with a resin material 119 such as 6-nylon, polyester after the formation of the tongue engaging hole 112 and the belt inserting hole 114, and at least a portion near the belt inserting hole 114 is coated as shown in FIG. 112, with the seat belt insertion hole 113 remaining uncoated, to thicken the thickness of that portion to provide a desired shape.

Figure 13:
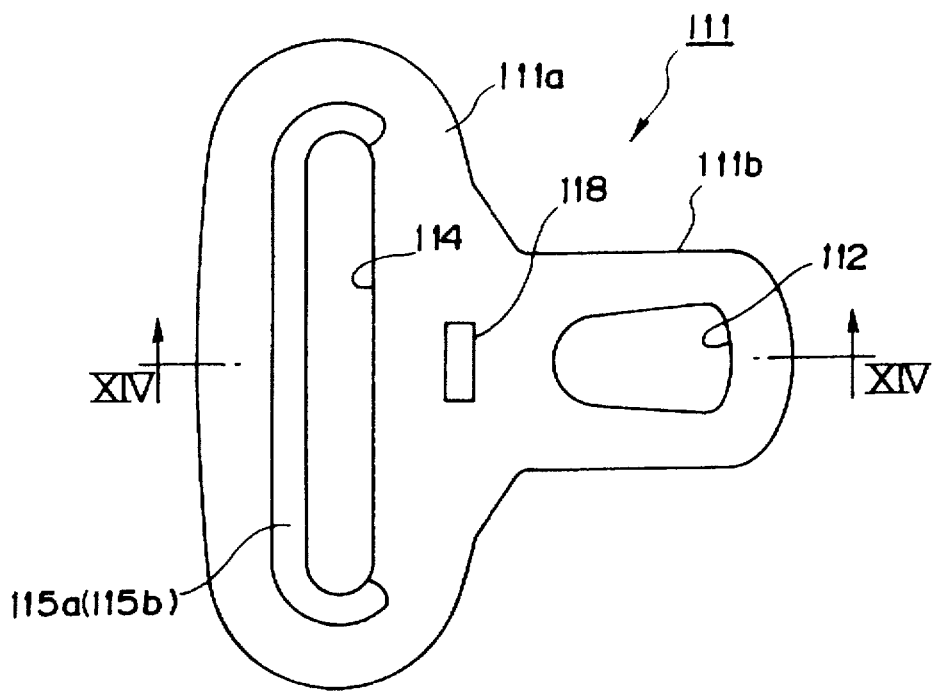
FIG. 13 is a plan view of a metal fitting plate constituting the tongue plate of this embodiment.
Figure 14:
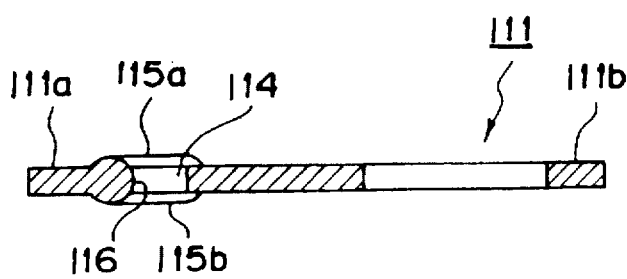
FIG. 14 is a sectional view taken along the line XIV—XIV in FIG. 13.

The belt inserting hole 114 formed to the metal fitting plate 111 is, as shown in FIGS. 13 and 14, formed to provide a longitudinal slot shape extending in a plate width direction, so that bulged portions 115a, 115b bulged in a good balanced state on both surface sides of the plate are formed to at least an edge portion on the belt engaging side of the belt inserting slot 114 and the belt engaging side edge portion provides in its section substantially a smooth circular shape.

Figure 15:
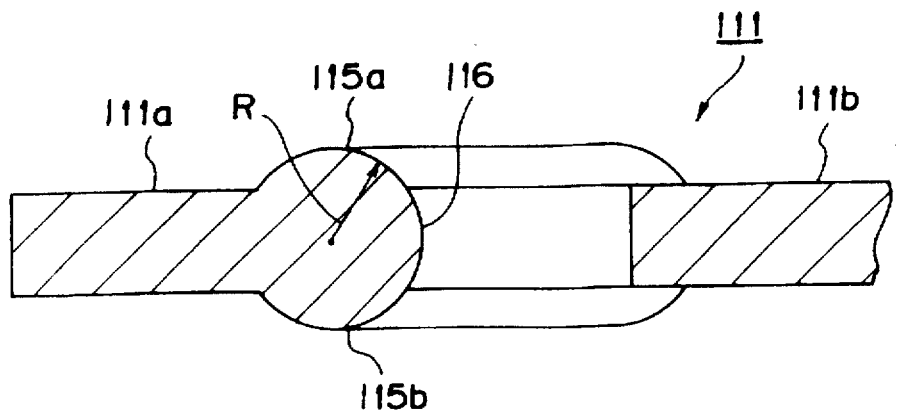
FIG. 15 is an enlarged sectional view of the plate portion of the tongue plate.

With reference to the belt inserting slot 114 of the metal fitting plate 111, as shown in FIG. 15, the side edge portion of the belt engaging side are protruded on both sides to thereby from the bulged portions 115a, 115b extending on both the sides of the plate in a balanced state, and according to this structure, the belt engaging side of the belt inserting slot 114 is formed to provide a smooth curved round surface 116, thereby making large the curvature radius R of the curved protruded portion of the belt engaging side of the belt insertion hole 114. According to this structure, it is not necessary to entirely make large the thickness of the metal fitting plate 111, and in one example, the thickness of the metal fitting plate 111 is made to 2.3 mm, that of the bulged portion 115a (115b) to more than 2.5 mm (diameter) such as, for example, 2.6 mm.

Furthermore, at least the side edge portion, or entire edge portion, of the belt engaging side are protruded to thereby from the bulged portions 115a, 115b extending on both the side surfaces of the plate so as to provide the curved protruded portion 116 having substantially a circular section. The curved protruded portions extend on both the sides of the plate 111 with large diameter, and accordingly, this structure is equivalent to the structure provided with a rib smoothly continuous from the inner edge portion of the belt inserting slot 114 at each of both the sides thereof. According to this structure, the mechanical strength of the metal fitting plate 111 is increased. In FIG. 11, a reference numeral 117 denotes a marking space and a reference numeral 18 denotes a lot number marking space.

In order to manufacture the tongue plate 106 as the belt connecting metal fitting of the present invention, the pressing machine shown in FIG. 6 may be utilized, and the manufacturing method of the tongue plate 106 by utilizing such pressing machine is substantially the same as that mentioned hereinbefore with reference to the first embodiment by substituting the belt connecting metal fitting 10 of the former embodiment with the tongue plate of this embodiment, and accordingly, the details thereof is omitted herein. However, the difference in this manufacturing method is in that no plate bending process is required and the molding process of the resin material for the resin coating is required.

Accordingly, the resin molding process according to this embodiment is described hereunder with reference to FIG. 6.

After the formation of the bulged portions 115a, 115b on both the sides of the belt inserting slot 114 of the metal fitting plate 111 by means of the forming punch 50 and the forming die 51, a strip steel plate 25 is again transferred to a forming punch and a die, both not shown, and the steel plate 25 is cut into respective metal fitting plates 111. The cut metal fitting plate 111 is then surface treated through such as plating process, and thereafter, subjected to heat treatment such as sintering and tempering process, and thereafter, a resin mold formation is performed to necessary portions to the metal fitting plate 111 to thereby produce a desired tongue plate 106 as the belt connecting metal fitting of the present invention.

The resin mold formation is performed such that the metal fitting plate 111 is set accurately in a splittable mold, not shown, by utilizing the tongue member formed with the tongue engaging hole 112, and subsequently, the heated and softened resin material or liquid state resin material is pressed into the mold in which the metal fitting plate 111 has been set and then hardened therein to form the tongue plate 106 having the desired shape.

Figure 12:
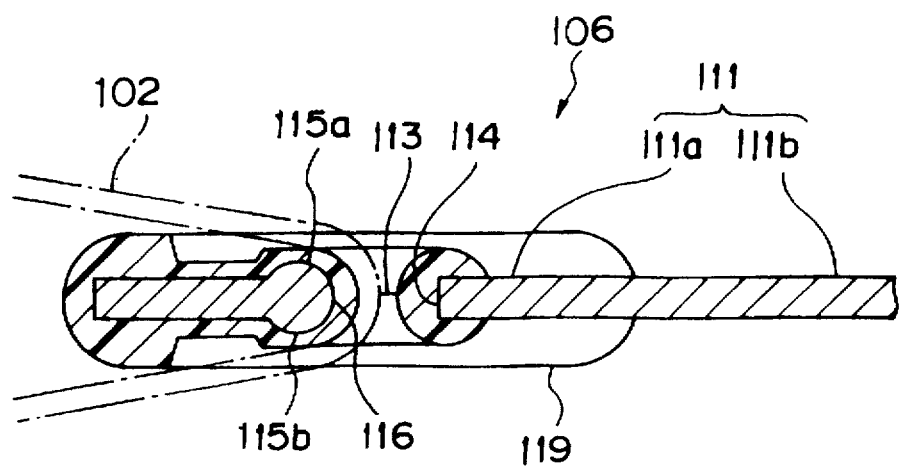
FIG. 12 is a sectional view taken along the line XII—XII in FIG. 11.

The seat belt engaging side, except the tongue portion 111a, of the tongue plate 106 is coated as shown in FIGS. 11 and 12 through the resin molding process, and in that process, the belt inserting slot 114 of the tongue plate 106 is thickened through the resin molding process so as to be coated by the resin with the seat belt insertion hole 113 remaining uncoated to thereby smoothly slidably guide the seat belt 102. Accordingly, the belt engaging side of the seat belt insertion hole 113 is formed to provide a smooth curved surface to which the belt inserted contacts and slides with a large contacting area maintained. Therefore, the seat belt 102 can be smoothly slid and, hence, the breakage or any damage of the seat belt can be effectively prevented and the durability of the seat belt can be improved. Furthermore, even if the resin coating 119 to the tongue plate 106 be damaged, the bulged portions 115a, 115b are formed to the edge portions of the belt inserting slot 114 on the belt engaging side thereof, so that the breakage or any damage of the belt can be also prevented. Thus, the smooth sliding of the seat belt 102 with no damage can be ensured even if the seat belt device 101 of the present invention be used for a long time in a repeated manner. The bulged portions may be formed along the entire peripheral edge portion of the belt inserting slot 114.

Figure 16:
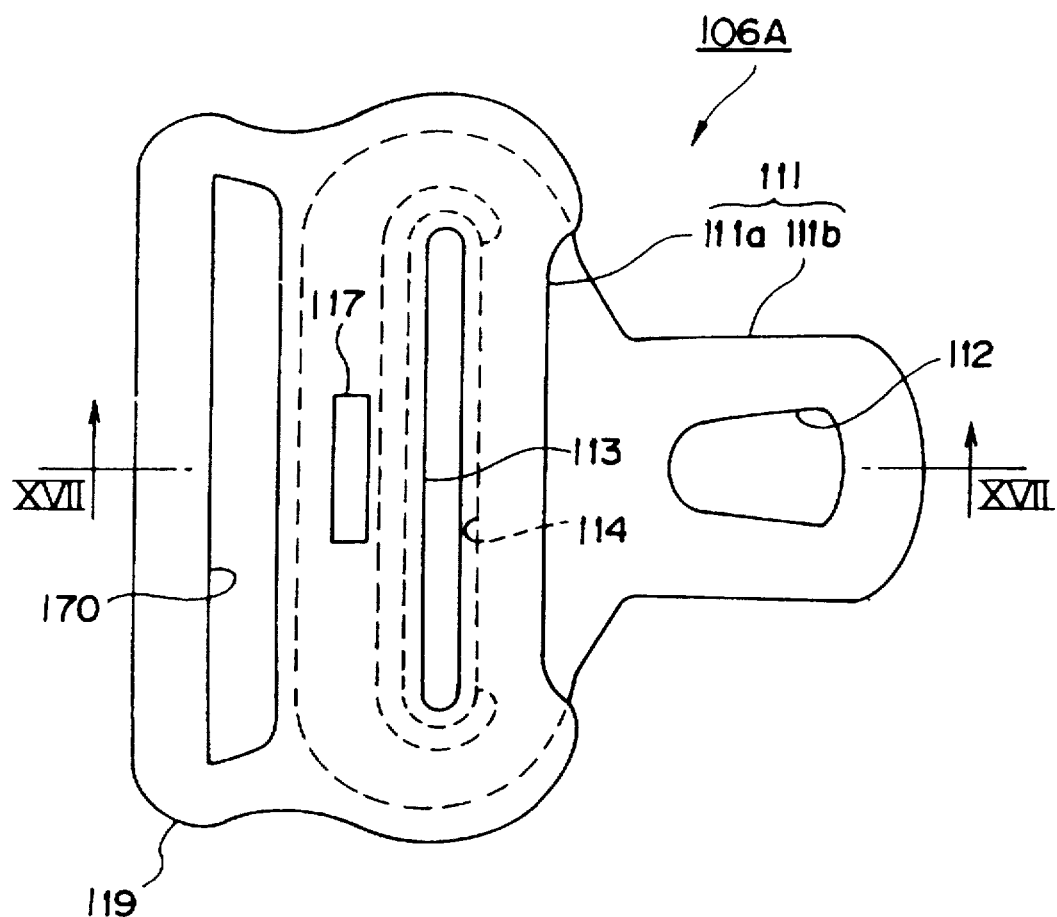
FIG. 16 is a plan view of a modified embodiment of the tongue plate of FIG. 11 as the belt connecting metal fitting.
Figure 17:
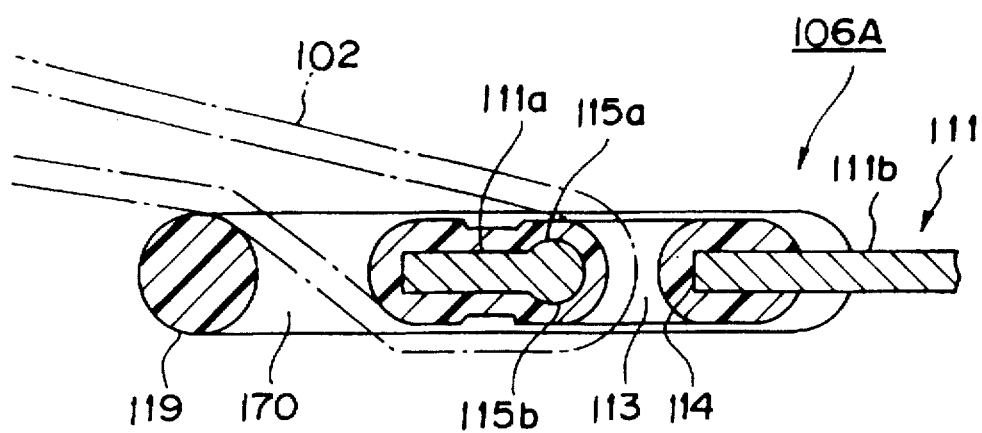
FIG. 17 is a sectional view taken along the line XVII—XVII in FIG. 16.

FIGS. 16 and 17 shows a modification of the tongue plate of the above embodiment.

Referring to FIGS. 16 and 17, a tongue plate 106A of this modified embodiment is generally formed of the metal fitting plate 111 having an outer shape substantially the same as that shown in FIG. 13 or 14. However, in this modification, at the molding process to the metal fitting plate 111 by the resin material 119, a slip prevention hole 170 is integrally formed of the resin material almost in parallel to the seat belt insertion hole 113 of the belt inserting slot 114. The at lease one end portion of the seat belt 102 through the seat belt insertion hole 113 is inserted and guided into the slip prevention hole 170, and accordingly, the tongue plate 106A can be maintained at a desired position of the seat belt 102 under the slip prevented condition.

Figure 18:
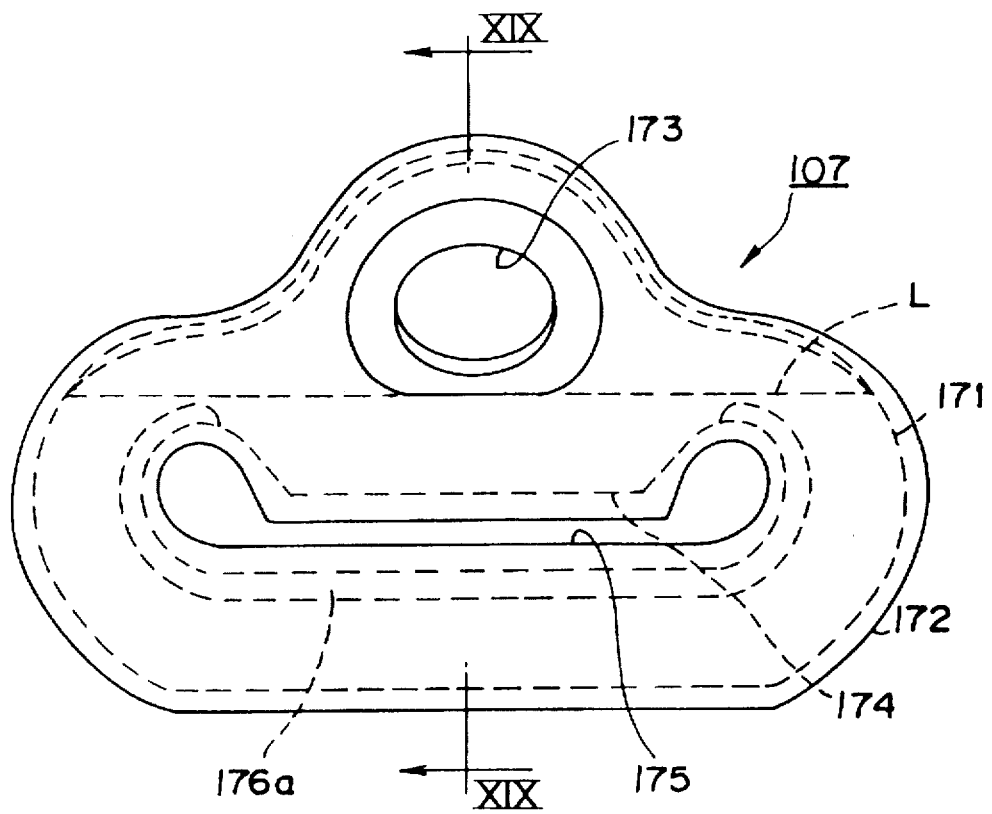
FIG. 18 is a fourth embodiment of a belt connecting metal fitting applied to a through anchor metal fitting according to the present invention.
Figure 19:
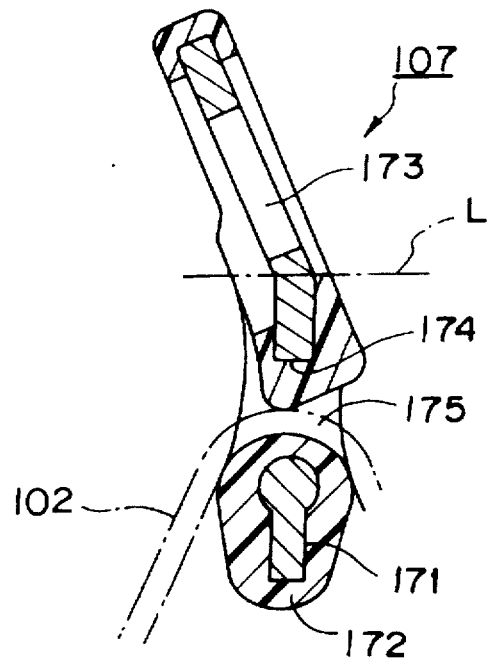
FIG. 19 is a sectional view taken along the line XIX—XIX in FIG. 18.

FIGS. 18 and 19 represent another embodiment of the belt connecting metal fitting of the present invention, which is applied to a through anchor metal fitting.

A through anchor metal fitting 107 of this embodiment is formed of a metal fitting plate 171 formed through a punching process of a belt-like steel plate having a thickness of, for example, 2.3 mm likely as mentioned with reference to the tongue plate 106 shown in FIGS. 11 and 12. The metal fitting plate 171 is bent along a bending line L so as to provide a predetermined bent angle of θ (about 20–40°) with respect to the horizontal plane of the plate body, and the surface of the plate is molded with a resin material 172 to provide a resin coating surface. The metal fitting plate 171 is formed with a plate mounting hole 173 into which a fixing bolt, not shown, is engaged and a belt inserting hole 174 through which a seat belt 102 is inserted. The belt inserting hole 174 is coated through the resin molding process to thereby form a slot-like hole through which the seat belt 102 is freely slidable in its longitudinal direction.

Figure 20:
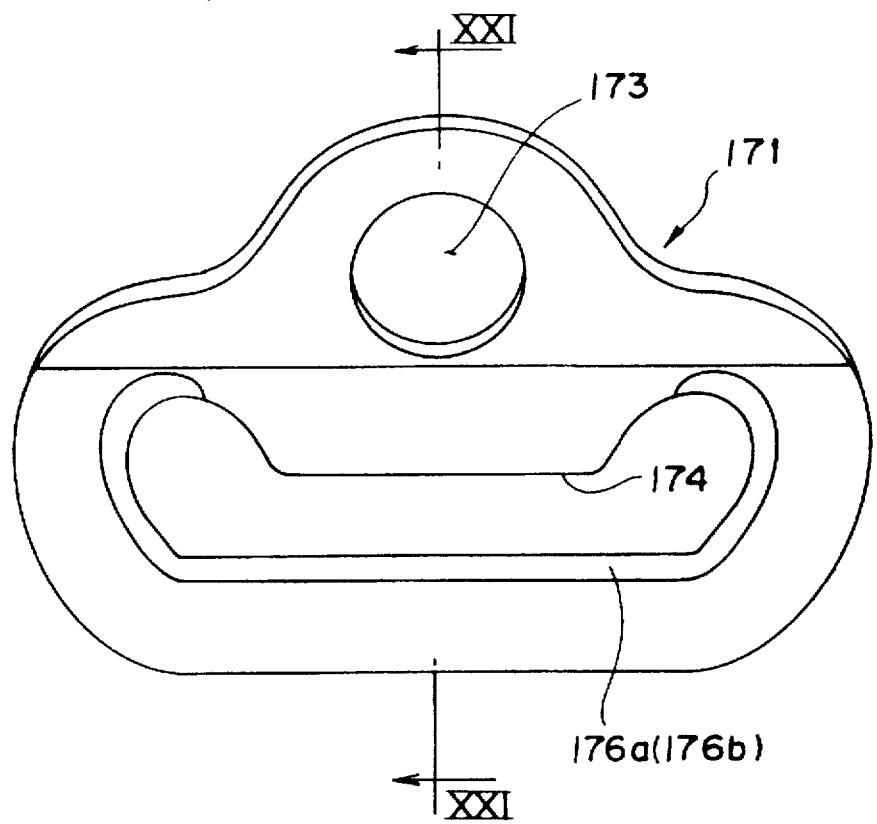
FIG. 20 is a plan view of a metal fitting plate of the through anchor metal fitting of FIG. 18.
Figure 21:
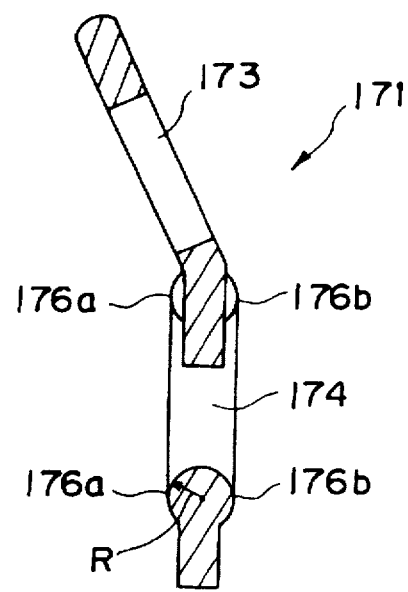
FIG. 21 is a sectional view taken along the line XXI—XXI in FIG. 20.

The belt inserting hole 174 formed to the metal fitting plate 171 has a slot-like shape extending in a plate width direction as shown in FIGS. 20 and 21, and bulged portions 176a, 176b protruded from both surfaces of the plate 174 at at least the belt engaging side edge portion of the belt inserting slot 174 each so as to provide a thickened smooth circular or curved section having a relatively large curvature radius R as shown in FIG. 21. Accordingly, when the belt 102 is inserted through the belt inserting slot 174, the belt 102 smoothly contacts the large contact surface of the circular or curved bulged portions 176a, 176b of the belt inserting slot 174, thus ensuring the smooth insertion and guiding of the belt 102.

The curved portions are protruded on both the sides of the metal fitting plate with large diameter, and accordingly, this structure will be said to be equivalent to the structure provided with a rib smoothly continuous to at least the belt engaging side edge portion of the belt inserting slot 174 thereby increasing the mechanical and physical strength of the metal fitting plate is increased.

The through anchor metal fitting 107 according to the present embodiment will be manufactured by the continuous pressing machine 20 shown in FIG. 6 in a manner substantially the same as that mentioned with reference to the former embodiments, so that the details thereof is omitted herein. However, there are slight differences in that the shapes of the forming punch and the die equipped for the pressing machine are different in the case of manufacturing the tongue plate 106 and that, after the strip steel plate is cut into respective metal fitting plates 171, the metal fitting plate 171 is bent along the bending line L to provide a desired angle θ as described in the first mentioned embodiment.

The metal fitting plates 171 are respectively formed from the strip steel plate, and thereafter, is positioned accurately in a splittable mold by utilizing the peripheral portion of the plate mounting hole 173. After the positioning of the metal fitting plate 171 in the splittable mold, the metal fitting plate 171 is subjected to the resin mold formation by utilizing the resin material 172 to thereby form a thickened portion on substantially the entire surface of the plate 171 except for the portion near the plate mounting hole 173. In this thickening process, the resin molding process may be performed so as to cover at least the seat belt engaging side of the belt inserting slot 174. The resin material covering the bulged portions 176a, 176b of the belt inserting slot 174 is formed so as to provide a relatively large curvature radius R of about 6–8 mm.

Figure 22:
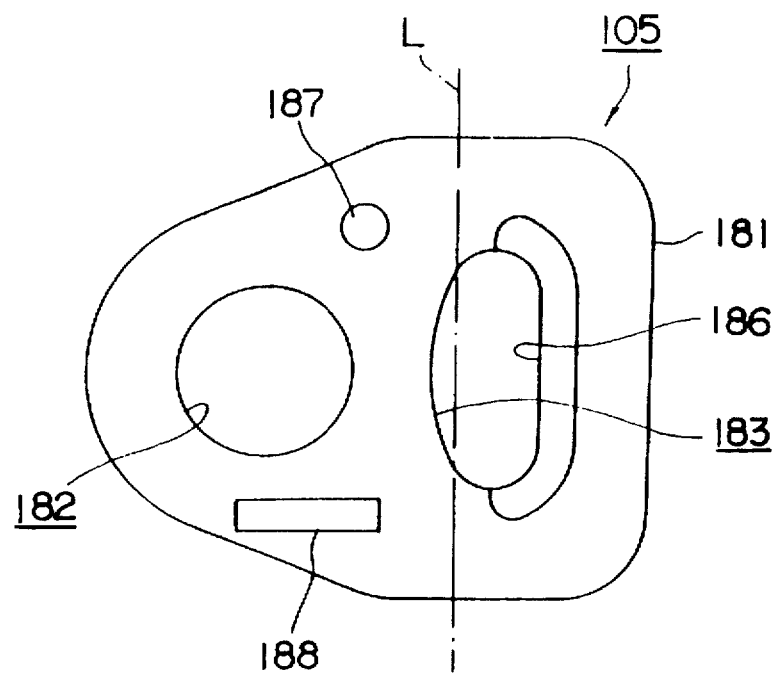
FIG. 22 is a plan view of a belt connecting metal fitting of a fifth embodiment of the present invention applied to a mini-anchor metal fitting.

FIGS. 22 and 23 represent another embodiment of a belt connecting metal fitting which is applied to an anchor metal fitting as a mini-anchor.

An anchor metal fitting 105 of this embodiment is provided with a metal fitting plate 181 punched from a strip steel plate as like the tongue plate 106 of the former embodiment. A high-tensile steel having a thickness of, for example, 4 mm is utilized as the strip steel plate for the metal fitting plate 181, and a plate insertion hole 182 through which an anchor bolt is inserted and a belt inserting hole 183 are formed to the metal fitting plate 181. After the formation of these holes, the metal fitting plate 181 is bent along the bending line L crossing over the belt insertion hole 183 with a desired angle θ, such as less then 60°, with respect to the horizontal portion of the plate. This angle is preferably of about 35°.

The belt inserting hole 183 is formed in shape of slot extending in the width direction of the plate 181, and bulged portions 185a, 185b are formed to the plate 181 so as to protrude in a balanced condition at both surface sides of the engaging edges of the belt inserting slot 183 so as to each provide a circular curved section.

The belt inserting slot 183 is firmed, as shown in FIG. 21A, such that the belt engaging side edge portions are thickened to thereby form the bulged portions 185a, 185b in the balanced condition on both the side surfaces of the plate 181 and each provide a circular smooth curved section suitable for the smooth insertion and guidance of the belt through the inserting slot 183. According to this structure, the curvature radius R of this circular curved portion formed to the edge portion of the belt inserting slot 183 can be made large without entirely thickening the thickness of the plate 181, and thus, the belt contacts the edge portions of the belt inserting slot 183 with large surface contact areas, thereby preventing the belt from being broken or damaged even for a long time use and hence improving the slidability and the durability of the belt.

Figure 23A:
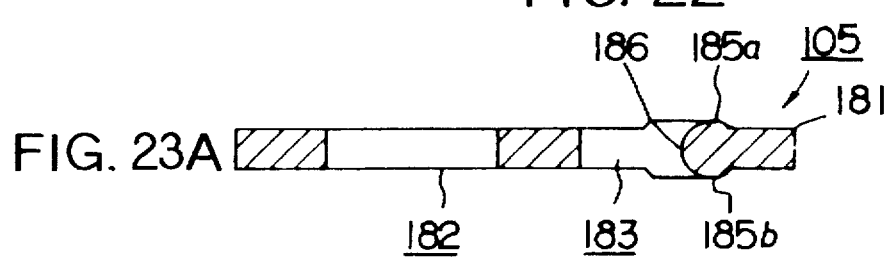
FIG. 23A is a sectional view of a metal fitting plate of the anchor metal fitting of this embodiment before the bending process and FIG. 23B is a sectional view thereof after the bending process.
Figure 23B:
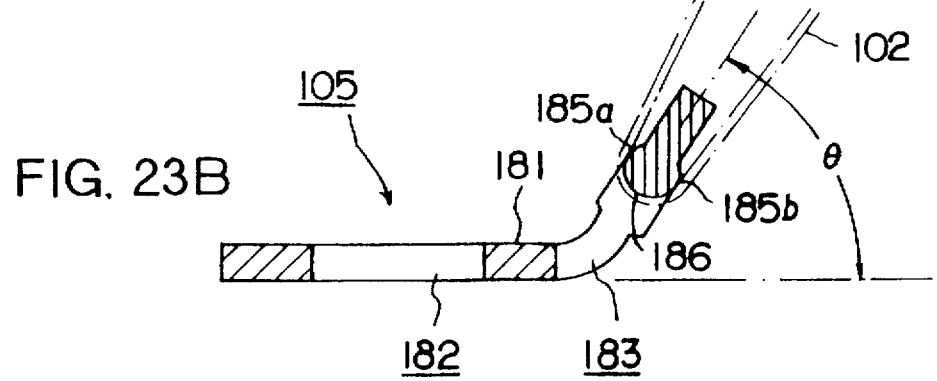

Furthermore, as shown in FIG. 23A or 23B, the bulged portion has a protruded front portion 186, and accordingly, this portion will serve as a rib portion having a round smooth surface contacting the belt, resulting in the increasing the rigidity of the metal fitting plate and hence improving the mechanical and physical strength of the metal fitting plate.

Further, in this embodiment, a reference numeral 187 denotes a marking space and a reference numeral 188 denotes a lot number marking space.

The manufacturing method of the anchor metal fitting of this embodiment is substantially the same as those mentioned with reference to the embodiment of the through anchor metal fitting 107 by utilizing the pressing machine shown in FIG. 6, so that the detailed of the method is not mentioned herein. In this embodiment of the anchor metal fitting, the resin molding process is not necessarily required, but the belt insertion hole 183 on the side of the seat belt engaging side may be molded to increase the curvature thereof.

According to the embodiments mentioned with reference to FIGS. 10 to 23, substantially the identical advantageous effects can be achieved to those mentioned with reference to FIGS. 1 to 9.

What is claimed is:

1. A belt connecting metal fitting for a seat belt device of a vehicle, comprising:

a metal fitting plate body formed of a strip steel plate;

a belt insertion means formed as a slot in the metal fitting plate body through which a seat belt is inserted; and a belt mounting means formed as a hole in the metal fitting plate body;

wherein said belt inserting slot is provided with bulged portions on both surfaces of the plate body so as to provide a thickened portion at least to an edge portion with which the belt is engaged to form a central belt insertion hole, the edge portion of the belt inserting slot having substantially circular curved cross section.

2. A belt connecting metal fitting according to claim 1, wherein said metal fitting plate body is bent along a line crossing over the belt inserting slot so as to provide a predetermined inclination.

3. A belt connecting metal fitting according to claim 1, is formed as an anchor metal fitting plate for a seat belt device of a vehicle.

4. A belt connecting metal fitting for a seat belt device of a vehicle, comprising:

a metal fitting plate body; and a belt insertion means formed as a slot in the metal fitting plate body through which a seat belt is inserted;

wherein said belt inserting slot is provided with bulged portions on both surfaces of the plate body having an otherwise uniform depth across both surfaces, so as to provide a thickened portion at least to an edge portion with which the belt is engaged to form a central belt insertion hole, the edge portion of the belt inserting slot having a smooth curved cross section and at least said belt engaging portion of the metal fitting plate body is coated with a resin material formed through a resin molding process with the belt insertion hole remaining uncoated.

5. A belt connecting metal fitting according to claim 4, wherein said metal fitting plate body is formed of a strip steel plate.

6. A belt connecting metal fitting according to claim 4, is formed as a tongue plate provided with a tongue engaging hole.

7. A belt connecting metal fitting according to claim 4, wherein said metal fitting plate body is provided with a slip prevention hole, for preventing the belt from slipping, formed on the belt engaging side of the plate body substantially in parallel to the belt inserting slot.

8. A belt connecting metal fitting according to claim 7, wherein said slip prevention hole is formed integrally through the resin molding process.

9. A belt connecting metal fitting according to claim 4 is formed as a through anchor metal fitting for a seat belt device of a vehicle.

10. A belt connecting metal fitting according to claim 4, is formed as a anchor metal fitting for a seat belt device of a vehicle.

11. A method of manufacturing a belt connecting metal fitting for a seat belt device of a vehicle comprising the steps of:

preparing a strip metal plate member from which a metal fitting plate of a belt connecting metal fitting is formed;

forming a belt inserting slot to the metal fitting plate through a punching process by means of a pressing punch and die with an extra clearance;

pressing and deforming one surface side of the metal fitting plate while spreading a surface on the extra clearance side of the punched belt inserting slot;

pressing the one surface from one surface side of the metal fitting plate to push back while rolling in a deformed portion of the belt inserting slot to protrude the deformed portion to another surface side of the metal fitting plate so as to form bulged portions which protrude on both surfaces of the metal fitting plate on the edge portion of the belt inserting slot at a concave curved surface so that the edge portion is formed as a belt engaging edge portion of the belt inserting slot.

12. A manufacturing method according to claim 11, wherein when the belt inserting slot of the metal fitting plate is formed, at least the belt engaging edge portion of the belt inserting slot is displaced so as to be rolled from a central portion thereof to both surfaces of the metal fitting plate so that the edge portion with the bulged portion of the belt inserting slot has an approximately circular curved cross section.

13. A manufacturing method according to claim 11, wherein a plurality of the metal fitting plates are formed from a strip steel plate member and then cut away to the respective metal fitting plates.

14. A manufacturing method according to claim 11, further comprising a step of forming a belt mounting hole to the metal fitting plate.

15. A manufacturing method according to claim 11, further comprising a step of bending the metal fitting plate along a line crossing over the belt inserting slot with a predetermined angle with respect to the horizontal portion of the metal fitting plate.

16. A manufacturing method according to claim 11, further comprising a step of performing a mold formation and coating with a resin material to the belt inserting slot on the belt engaging side portion thereof with a central seat belt insertion hole remaining uncoated.

17. A manufacturing method according to claim 11, wherein said metal fitting plate is provided with a slip prevention hole for preventing the belt from slipping, formed on the belt engaging side of the plate body substantially in parallel to the belt inserting slot.

18. A manufacturing method according to claim 17, wherein said slip prevention hole is formed integrally through the resin molding process.

* * * * *